US012794378B2

(12) United States Patent
Nakada et al.

(10) Patent No.: US 12,794,378 B2
(45) Date of Patent: Nov. 10, 2026

(54) POWER CONVERSION DEVICE

(71) Applicant: Mitsubishi Electric Corporation, Tokyo (JP)

(72) Inventors: Yujiro Nakada, Tokyo (JP); Kenta Fujii, Tokyo (JP); Satoshi Ishibashi, Tokyo (JP); Naoya Abe, Tokyo (JP); Yoshihiro Takeshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 156 days.

(21) Appl. No.: 18/834,345

(22) PCT Filed: Oct. 28, 2022

(86) PCT No.: PCT/JP2022/040390

§ 371 (c)(1),
(2) Date: Jul. 30, 2024

(87) PCT Pub. No.: WO2023/210045

PCT Pub. Date: Nov. 2, 2023

(65) Prior Publication Data

US 2025/0150002 A1 May 8, 2025

(30) Foreign Application Priority Data

Apr. 26, 2022 (JP) ................................ 2022-072080

(51) Int. Cl.
*H02M 1/32* (2007.01)
*B60L 50/51* (2019.01)
(Continued)

(52) U.S. Cl.
CPC ........... *H02M 7/5387* (2013.01); *B60L 50/51* (2019.02); *H02M 1/327* (2021.05); *H02M 1/346* (2021.05); *B60L 2210/40* (2013.01)

(58) Field of Classification Search
CPC ...... H02M 1/327; H02M 1/346; H02M 7/003; H02M 7/5387; H05K 7/14329; H05K 7/120927; B60L 2210/40; B60L 50/51
See application file for complete search history.

(56) References Cited

U.S. PATENT DOCUMENTS

2010/0327654 A1 12/2010 Azuma et al.
2021/0144888 A1* 5/2021 Sano .................... H02M 7/003
(Continued)

FOREIGN PATENT DOCUMENTS

JP 2000-092847 A 3/2000
JP 2011-015460 A 1/2011
(Continued)

OTHER PUBLICATIONS

Extended European Search Report dated Sep. 8, 2025 from the European Patent Office in Application No. 22940316.7.
(Continued)

*Primary Examiner* — Sisay G Tiku
(74) *Attorney, Agent, or Firm* — Sughrue Mion, PLLC

(57) ABSTRACT

A power conversion device includes a DC connection member, an AC connection member, a power module, a capacitor, a housing having a cooling surface, and a control board. The power module has a module body portion, a DC connection terminal connected to the DC connection member, and an AC connection terminal connected to an AC connection member. The AC connection member and the AC connection terminal are located on one side in a first direction of the module body portion, and the capacitor is located on another side in the first direction of the module body portion. The DC connection terminal is located on one side or another side in the second direction of the module body portion. The DC connection member has an opposed portion opposed to
(Continued)

the cooling surface, and at least a part of the opposed portion is thermally connected to the cooling surface.

18 Claims, 11 Drawing Sheets

(51) Int. Cl.
*H02M 1/34* (2007.01)
*H02M 7/5387* (2007.01)

(56) References Cited

U.S. PATENT DOCUMENTS

| | | | | |
|---|---|---|---|---|
| 2021/0273575 | A1* | 9/2021 | Kitahama | H02M 7/003 |
| 2022/0158566 | A1* | 5/2022 | Seki | H02M 7/003 |
| 2023/0291322 | A1* | 9/2023 | Katsube | H05K 7/20927 |
| 2023/0336091 | A1* | 10/2023 | Takahashi | H02M 1/0048 |
| 2023/0396183 | A1* | 12/2023 | Katsube | H02M 7/003 |

FOREIGN PATENT DOCUMENTS

| | | | |
|---|---|---|---|
| JP | 2018-166400 | A | 10/2018 |
| WO | 2020/169998 | A1 | 8/2020 |
| WO | 2020/201799 | A1 | 10/2020 |

OTHER PUBLICATIONS

International Search Report for PCT/JP2022/040390 dated Dec. 20, 2022 (PCT/ISA/210).

* cited by examiner

POWER CONVERSION DEVICE

CROSS REFERENCE TO RELATED APPLICATIONS

This application is a National Stage of International Application No. PCT/JP2022/040390filed Oct. 28, 2022, claiming priority based on Japanese Patent Application No. 2022-072080 filed Apr. 26, 2022.

TECHNICAL FIELD

The present disclosure relates to a power conversion device.

BACKGROUND ART

In an electrified vehicle such as an electric vehicle or a hybrid vehicle using a motor as a driving source, a power conversion device for electric powertrain is provided. Examples of power conversion devices include a charger which converts commercial AC power to DC power to charge a high-voltage battery, a DC/DC converter which converts DC power of a high-voltage battery to voltage (e.g., 12 V) for an auxiliary-device battery, and an inverter which converts DC power of a battery to AC power for a motor. The power conversion device is a device that converts input current from DC to AC or from AC to DC, or converts input voltage to different voltage.

In such a power conversion device used in an electrified vehicle, size reduction of main circuit components such as a power module and a capacitor has been attempted in order to reduce a projected area. Meanwhile, when the sizes of a power module and a capacitor are reduced, the degree of freedom of directions in which wiring components of a main circuit for supplying power are led out is reduced, so that connection between wiring components and with the main circuit is complicated.

A configuration of a vehicular power conversion device incorporating some measures using a power module structure so as to achieve inductance reduction and size reduction, is disclosed (see, for example, Patent Document 1). In the configuration disclosed in Patent Document 1, a DC input portion and an AC output portion of a power module having a reduced size are arranged in an L shape. In addition, in order to connect the power module and a capacitor, a PN stacked busbar having a large area is provided above the power module.

CITATION LIST

Patent Document

Patent Document 1: Japanese Laid-Open Patent Publication No. 2011-15460

SUMMARY OF THE INVENTION

Problem to be Solved by the Invention

In Patent Document 1, since the DC input portion and the AC output portion of the power module are arranged in an L shape, the size of the power module can be reduced. In addition, since the PN stacked busbar having a large area is provided above the power module, the inductance of the power conversion device can be reduced. However, in this structure, since PN terminals in the power module and the PN stacked busbar having a large area are provided above the power module, heat generated at the PN stacked busbar having an increased size influences members provided therearound. In addition, considering suppression of heat generation at the PN stacked busbar, the output of the power conversion device cannot be increased.

The present disclosure has been made to solve the above problems, and an object of the present disclosure is to provide a power conversion device having an increased output while suppressing heat generation at a DC connection member connecting a power module and a capacitor.

Means to Solve the Problem

A power conversion device according to the present disclosure includes: a DC connection member through which DC power flows; an AC connection member through which AC power flows; a power module electrically connected to the DC connection member and the AC connection member, and having a power semiconductor element for performing power conversion between the DC power of the DC connection member and the AC power of the AC connection member; a capacitor electrically connected to the DC connection member; a housing having a cooler and a cooling surface cooled by the cooler, the power module being thermally connected to the cooling surface; and a control board which controls a switching operation of the power semiconductor element. The power module has a module body portion, a DC connection terminal protruding from the module body portion and electrically connected to the DC connection member, and an AC connection terminal protruding from the module body portion and electrically connected to the AC connection member. One direction parallel to the cooling surface is defined as a first direction, and a direction parallel to the cooling surface and perpendicular to the first direction is defined as a second direction. The AC connection member and the AC connection terminal are located on one side in the first direction of the module body portion, and the capacitor is located on another side in the first direction of the module body portion. The DC connection terminal is located on one side or another side in the second direction of the module body portion. The DC connection member has an opposed portion opposed to the cooling surface, and at least a part of the opposed portion is thermally connected to the cooling surface.

Effect of the Invention

The power conversion device according to the present disclosure includes the power module electrically connected to the DC connection member, and the capacitor electrically connected to the DC connection member. The power module has the module body portion, the DC connection terminal protruding from the module body portion and electrically connected to the DC connection member, and the AC connection terminal protruding from the module body portion and electrically connected to the AC connection member. The AC connection member and the AC connection terminal are located on the one side in the first direction of the module body portion, and the capacitor is located on the other side in the first direction of the module body portion. The DC connection terminal is located on the one side or the other side in the second direction of the module body portion. The DC connection member has the opposed portion opposed to the cooling surface, and at least a part of the opposed portion is thermally connected to the cooling surface. Thus, heat generated at the DC connection member, heat transferred from the power module side to the DC connection member, and heat transferred from the capacitor side to the DC connection member, can be dissipated to the housing from the opposed portion thermally connected to the cooling surface. Thus, the power conversion device having an increased output while suppressing heat generation at the DC connection member can be provided.

DESCRIPTION OF EMBODIMENTS

Figure 1:
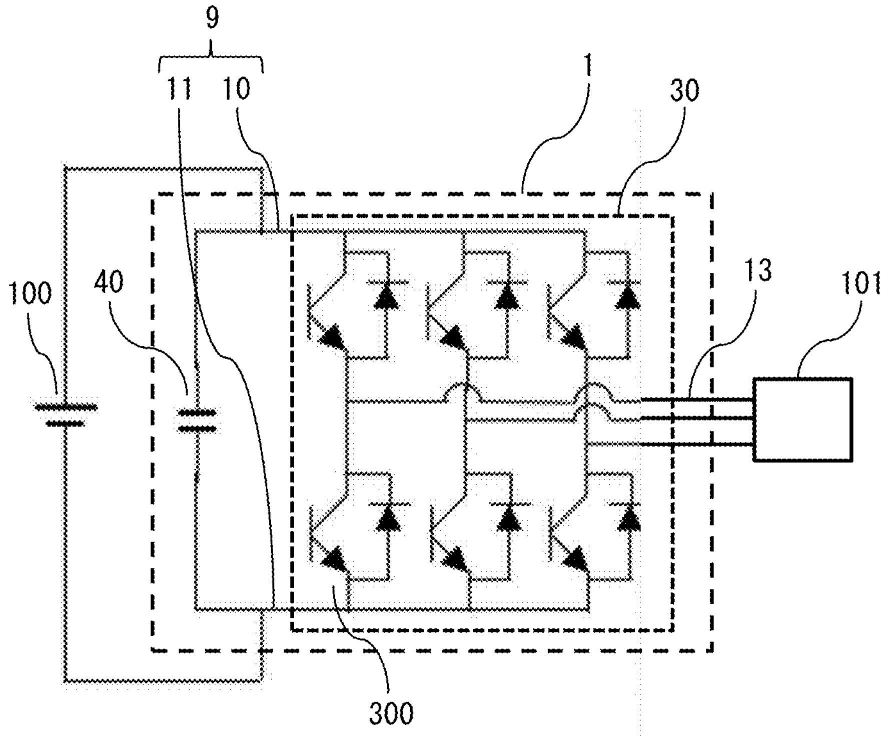
FIG. 1 schematically shows a circuit of a power conversion device according to embodiment 1.

Hereinafter, a power conversion device according to embodiments of the present disclosure will be described with reference the drawings. In the drawings, the same or corresponding members and parts are denoted by the same reference characters, to give description.

Embodiment 1

Figure 2:
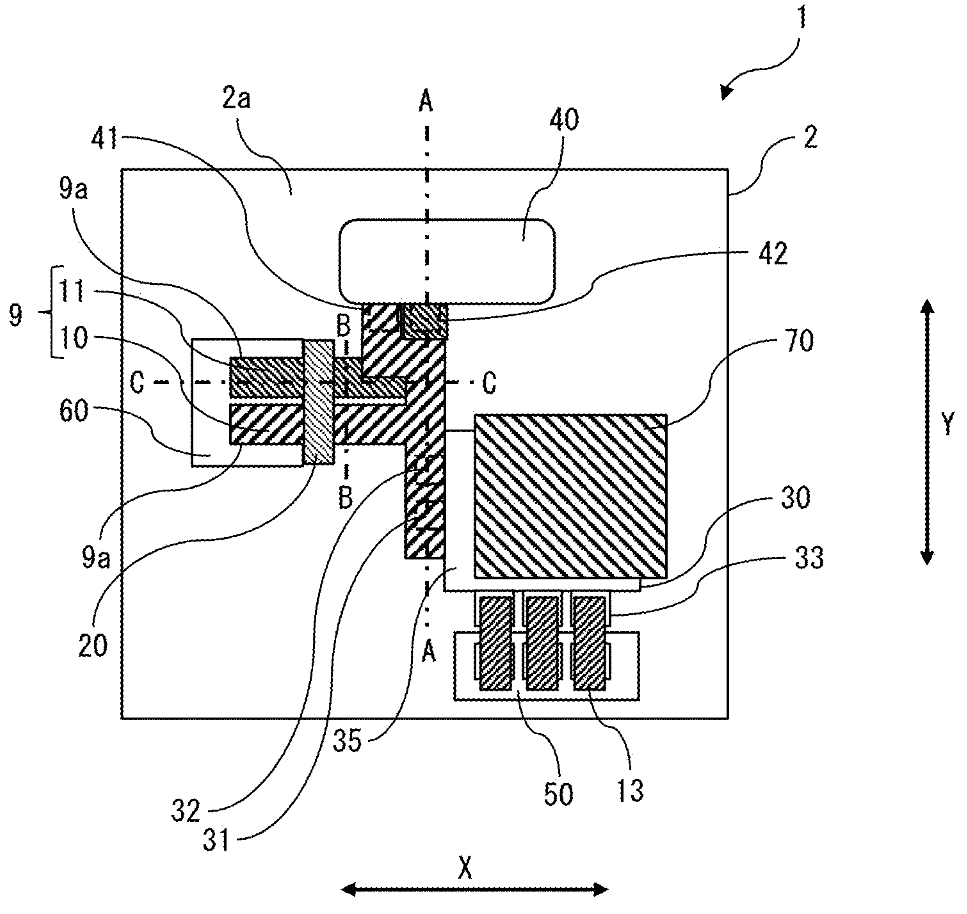
FIG. 2 is a plan view schematically showing the power conversion device according to embodiment 1.
Figure 3:
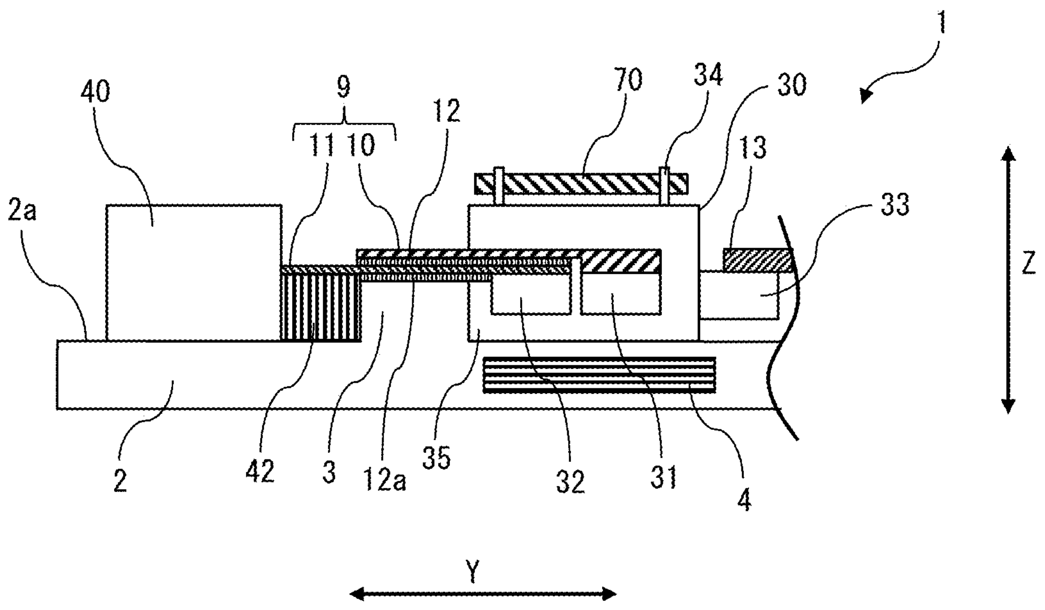
FIG. 3 is a sectional view of the power conversion device taken at an A-A cross-section position in FIG. 2.
Figure 4:
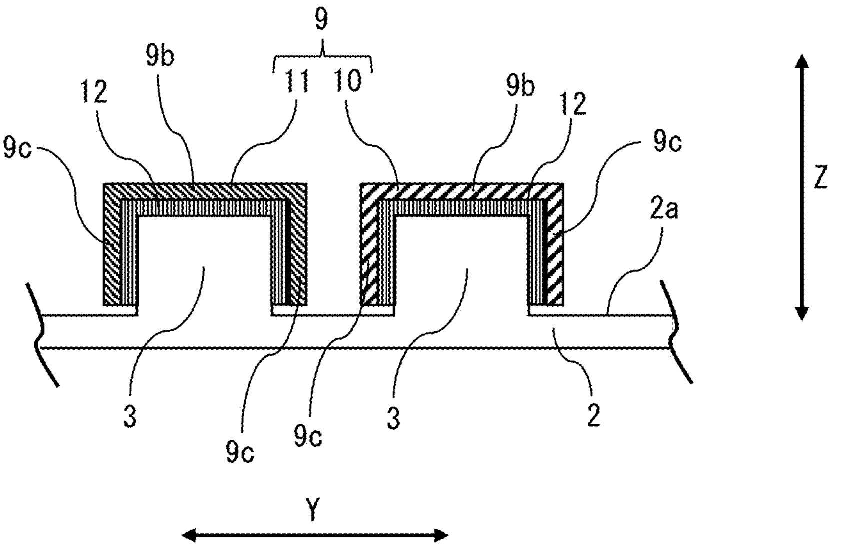
FIG. 4 is a sectional view of the power conversion device taken at a B-B cross-section position in FIG. 2.
Figure 5:
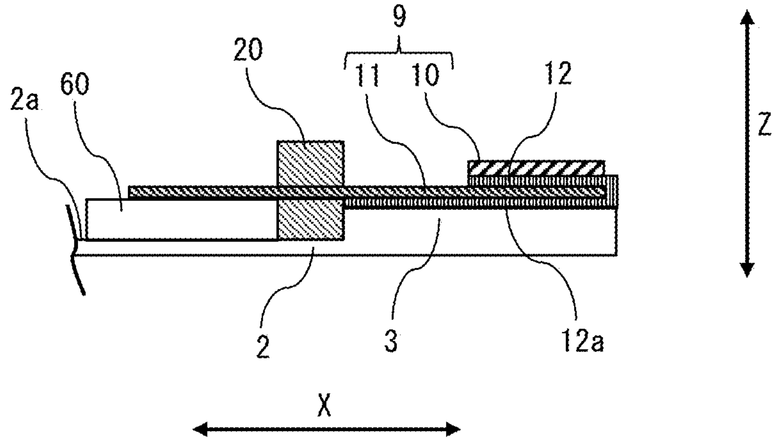
FIG. 5 is a sectional view of the power conversion device taken at a C-C cross-section position in FIG. 2.

FIG. 1 schematically shows a circuit of a power conversion device 1 according to embodiment 1, FIG. 2 is a plan view schematically showing the power conversion device 1, FIG. 3 is a sectional view of the power conversion device 1 taken at an A-A cross-section position in FIG. 2, FIG. 4 is a sectional view of the power conversion device 1 taken at a B-B cross-section position in FIG. 2, and FIG. 5 is a sectional view of the power conversion device 1 taken at a C-C cross-section position in FIG. 2. The power conversion device 1 is a device that converts input current from DC to AC or from AC to DC, or converts input voltage to different voltage. In the present disclosure, the power conversion device 1 is described as a three-phase inverter that converts DC power to AC power, but the power conversion device according to the present disclosure is not limited to a three-phase inverter.

<Circuit Configuration of Power Conversion Device 1>

The schematic circuit configuration of the power conversion device 1 will be described with reference to FIG. 1. The power conversion device 1 includes a power module 30 and a capacitor 40. The power conversion device 1 is connected to a battery 100 present outside. The power conversion device 1 includes a DC connection member 9 through which DC power flows, and an AC connection member 13 through which AC power flows. The capacitor 40 is electrically connected to the DC connection member 9. The power module 30 is electrically connected to the DC connection member 9 and the AC connection member 13. The power module 30 has a plurality of power semiconductor elements 300 for performing power conversion between DC power of the DC connection member 9 and AC power of the AC connection member 13. The AC power is outputted from the AC connection member 13 to a three-phase motor 101, thus driving the three-phase motor 101.

As the power semiconductor elements 300, a power control semiconductor element such as a metal oxide semiconductor field effect transistor (MOSFET) or an insulated gate bipolar transistor (IGBT), a flyback diode, or the like is used. The semiconductor elements are not limited thereto, and another semiconductor element such as a bipolar transistor may be used. In the present embodiment, a configuration in which a MOSFET is used and a parasitic diode of the MOSFET is used as a flyback diode, is adopted. However, for example, in such a case where a switching element such as an IGBT that does not have a parasitic diode is used, a flyback diode may be added in parallel. Alternatively, a reverse conducting IGBT (RC-IGBT) having a switching element and a flyback diode integrated with each other may be used.

In a case where a MOSFET or an RC-IGBT is used for the power semiconductor elements 300, it becomes unnecessary to provide a flyback diode, so that the number of elements provided in the power module 30 is decreased, whereby the size of the power module 30 can be reduced. Since the size of the power module 30 is reduced, the space for providing the capacitor 40 can be easily ensured, and therefore the space for cooling the DC connection member 9 can be easily ensured.

The power semiconductor elements 300 are formed at a semiconductor substrate made of a material such as silicon, silicon carbide, or gallium nitride, and a wide bandgap semiconductor element having a wider bandgap than silicon may be used for the power semiconductor elements 300. In a case where a MOSFET made of silicon carbide, which is a wide bandgap semiconductor element, is used, a temporal change di/dt of current occurring in switching can be made greater than in a case of a MOSFET made of silicon. In addition, since the wide bandgap semiconductor element is small in ON resistance, small in loss, and small in heat generation, the chip area can be reduced. Since the chip area is reduced, the size of the power module 30 can be reduced. Since the size of the power module 30 is reduced, the space for providing the capacitor 40 can be easily ensured, and therefore the space for cooling the DC connection member 9 can be easily ensured.

<Configuration of Power Conversion Device 1>

The configuration of the power conversion device 1 will be described with reference to FIG. 2 to FIG. 5. The power conversion device 1 includes the power module 30, the capacitor 40, the DC connection member 9, the AC connection member 13, a housing 2, and a control board 70. The power conversion device 1 further includes a DC input portion 60 which is a part where the DC connection member 9 is connected to the battery 100, an AC output portion 50 which is a part where the AC connection member 13 is connected to the three-phase motor 101, and a magnetic member 20. The housing 2 has a cooler 4 and a cooling surface 2_a_ cooled by the cooler 4. The power module 30 is thermally connected to the cooling surface 2_a_. The control board 70 controls switching operations of the power semiconductor elements 300. In the drawings, one direction parallel to the cooling surface 2*a* is defined as a first direction (arrow Y), a direction parallel to the cooling surface 2*a* and perpendicular to the first direction is defined as a second direction (arrow X), and a direction perpendicular to the first direction and the second direction is defined as a third direction (arrow Z).

The housing 2 is made from a metal material such as aluminum, or a resin member. The cooler 4 is a flow path through which a coolant flows, for example. As the coolant, for example, water or an ethylene glycol solution is used. In FIG. 3, a configuration in which the cooler 4 is provided in the housing 2 is shown. However, without limitation thereto, the cooler 4 may be provided at a surface of the housing 2 on a side opposite to the cooling surface 2*a*. Such a cooler 4 may be further provided on the capacitor 40 side. In the present embodiment, in addition to the power module 30, the capacitor 40 is thermally connected to the cooling surface 2*a*. With this configuration, heat generated at the capacitor 40 is transferred to the housing 2, whereby temperature increase in the capacitor 40 can be suppressed. Since temperature increase in the capacitor 40 is suppressed, the life of the capacitor 40 can be prolonged.

In the present embodiment, a positive-side terminal 41 and a negative-side terminal 42 of the capacitor 40 are formed such that terminal parts made of metal are coated with a resin member. The positive-side terminal 41 and the negative-side terminal 42 are parts indicated by broken lines in FIG. 2. The positive-side terminal 41 and the negative-side terminal 42 are thermally connected to the housing 2 via resin member parts. Thus, heat generated at the capacitor 40 can be dissipated to the housing 2 through the positive-side terminal 41 and the negative-side terminal 42. Since heat generated at the capacitor 40 is dissipated to the housing 2 through the positive-side terminal 41 and the negative-side terminal 42, temperature increase in the capacitor 40 can be further suppressed, whereby the life of the capacitor 40 can be further prolonged. In the present embodiment, the capacitor 40, the positive-side terminal 41, and the negative-side terminal 42 are directly provided at the cooling surface 2*a*. However, a heat dissipation member may be provided between the above member and the cooling surface 2*a*.

As shown in FIG. 3, the power module 30 has a module body portion 35, a positive-side DC connection terminal 31 and a negative-side DC connection terminal 32 which are DC connection terminals protruding from the module body portion 35 and electrically connected to the DC connection member 9, an AC connection terminal 33 protruding from the module body portion 35 and electrically connected to the AC connection member 13, and a signal terminal 34 protruding from the module body portion 35 and electrically connected to the control board 70. The DC connection member 9 has a positive-side connection member 10 electrically connected to the positive-side terminal 41 of the capacitor 40 and the positive-side DC connection terminal 31, and a negative-side connection member 11 electrically connected to the negative-side terminal 42 of the capacitor 40 and the negative-side DC connection terminal 32.

<Arrangement Configuration of Portions and Details of Configuration>

The arrangement configuration of portions composing the power conversion device 1 and the details of the configuration will be described. As shown in FIG. 2, the AC connection member 13 and the AC connection terminal 33 are located on one side in the first direction of the module body portion 35, and the capacitor 40 is located on another side in the first direction of the module body portion 35. The positive-side DC connection terminal 31 and the negative-side DC connection terminal 32 are located on one side or another side in the second direction of the module body portion 35. In the present embodiment, the positive-side DC connection terminal 31 and the negative-side DC connection terminal 32 are located on the one side in the second direction of the module body portion 35. With this configuration, the DC connection terminal and the AC connection terminal 33 are separately provided in different directions, whereby the size of the power module 30 can be reduced.

The DC connection member 9 has an opposed portion opposed to the cooling surface 2*a*, and at least a part of the opposed portion is thermally connected to the cooling surface 2*a*. With this configuration, heat generated at the DC connection member 9, heat transferred from the power module 30 side to the DC connection member 9, and heat transferred from the capacitor 40 side to the DC connection member 9, can be dissipated to the housing 2 from the opposed portion thermally connected to the cooling surface 2*a*. Thus, the power conversion device 1 having an increased output while suppressing heat generation at the DC connection member 9 can be provided. In the present embodiment, as shown in FIG. 3, the cooling surface 2*a* has a protrusion 3 protruding toward the DC connection member 9 side, and at least a part of the opposed portion is thermally connected to the protrusion 3. With this configuration, heat generated at the DC connection member 9, heat transferred from the positive-side DC connection terminal 31 and the negative-side DC connection terminal 32 to the DC connection member 9, and heat transferred from the positive-side terminal 41 and the negative-side terminal 42 to the DC connection member 9, can be dissipated to the housing 2 through the protrusion 3. Since heat of the DC connection member 9 is dissipated to the housing 2 through the protrusion 3, temperature increase in the capacitor 40 can be suppressed even when large current flows, whereby the life of the capacitor 40 can be prolonged.

An insulation member 12 or an additional insulation member 12*a* is provided between the DC connection member 9 and the protrusion 3, thus making insulation between the DC connection member 9 and the protrusion 3. In FIG. 3, an example in which the insulation member 12 and the additional insulation member 12*a* formed in sheet shapes are provided, is shown. However, the configurations of the insulation member 12 and the additional insulation member 12*a* are not limited thereto, and the insulation member 12 may be air or may be a liquid or solid insulation member.

In the present embodiment, a configuration in which the opposed portion is thermally connected to the protrusion 3 is shown. However, a configuration for thermally connecting the opposed portion to the cooling surface 2*a* is not limited thereto. The DC connection member 9 may be bent to the cooling surface 2*a* side so that the opposed portion is thermally connected to the cooling surface 2*a*. In a case where the protrusion 3 is provided and the opposed portion is thermally connected to the protrusion 3, the length of the DC connection member 9 can be shortened, whereby the inductance of the DC connection member 9 can be reduced. Since the inductance of the DC connection member 9 is reduced, heat generation at the DC connection member 9 can be suppressed.

The positive-side connection member 10 and the negative-side connection member 11 are located on the one side or the other side in the second direction of the module body portion 35. In the present embodiment, the positive-side connection member 10 and the negative-side connection member 11 are located on the one side in the second direction of the module body portion 35. With this configuration, the positive-side connection member 10 and the negative-side connection member 11 do not pass on the control board 70 side of the module body portion 35, and therefore heat of the DC connection member 9 can be efficiently dissipated to the housing 2. In addition, the length of the DC connection member 9 can be shortened, whereby the inductance of the DC connection member 9 can be reduced. In addition, since the positive-side connection member 10 and the negative-side connection member 11 do not pass on the control board 70 side of the module body portion 35, the power conversion device 1 can be formed with a small height.

In the present embodiment, the control board 70 is located so as to overlap the power module 30 without overlapping the positive-side connection member 10 and the negative-side connection member 11, as seen in the direction perpendicular to the cooling surface 2*a*, as shown in FIG. 2. With this configuration, the positive-side connection member 10 and the negative-side connection member 11 are not located on one side or another side in the third direction of the control board 70, and therefore the positive-side connection member 10 and the negative-side connection member 11 are not present near the control board 70. Thus, heat transfer and noise influence from the positive-side connection member 10 and the negative-side connection member 11 to the control board 70 can be reduced.

In the present embodiment, the positive-side connection member 10 and the negative-side connection member 11 are each formed in a plate shape. The positive-side connection member 10 and the negative-side connection member 11 are made from a metal material such as copper, for example. As shown in FIG. 3, the positive-side connection member 10 and the negative-side connection member 11 have parts arranged in a stacked manner with the insulation member 12 interposed therebetween. With this configuration, the positive-side connection member 10 and the negative-side connection member 11 are arranged so as to form parallel flat plates, whereby the inductance of the DC connection member 9 can be reduced. Since the inductance of the DC connection member 9 is reduced, surge voltage due to switching of the power semiconductor elements 300 can be reduced.

In the present embodiment, as shown in FIG. 2, the DC connection member 9 is branched at a part between the capacitor 40 and the DC connection terminal. A branched connection member which is a branched part of the DC connection member 9 has, at an end on a side opposite to a branch-base side, a power supply connection terminal portion 9*a* connected to a DC power supply. The power supply connection terminal portion 9*a* is connected to the battery 100 (not shown in FIG. 2) which is the DC power supply, at the DC input portion 60. With this configuration, even in a case where large current is sent or received to or from the DC side, e.g., power is supplied from the DC input portion 60 to another power module or load, since at least a part of the opposed portion of the DC connection member 9 is thermally connected to the cooling surface 2*a*, temperature increase in the capacitor 40 can be suppressed and a long life of the capacitor 40 can be ensured.

The DC input portion 60 and the AC output portion 50 are located at different positions. The AC output portion 50 is located on the one side in the first direction of the module body portion 35, as with the AC connection member 13 and the AC connection terminal 33. The DC input portion 60 is located on the one side in the second direction of the module body portion 35, as with the positive-side DC connection terminal 31 and the negative-side DC connection terminal 32. Owing to the above arrangement of the DC input portion 60 and the AC output portion 50, in a case where the three-phase motor 101 and the power conversion device 1 are integrated with each other, if the position of the AC output portion 50 is at a motor-axis-direction end which can be easily connected with the three-phase motor 101, the battery 100 is located in a direction (DC input portion 60 side) different from the motor-axis direction, so that the battery 100 and the DC input portion 60 can be easily connected.

In the present embodiment, as shown in FIG. 4, at least a part of the opposed portion of the DC connection member 9 has a top surface opposed part 9*b* opposed to a top surface of the protrusion 3 and a side surface opposed part 9*c* opposed to a side surface of the protrusion 3, and thus is bent so as to surround the protrusion 3. With this configuration, the area of the opposed portion of the DC connection member 9 thermally connected to the protrusion 3 can be increased, whereby the effect of heat dissipation from the DC connection member 9 to the housing 2 can be enhanced. In addition, the sectional areas of the positive-side connection member 10 and the negative-side connection member 11 composing the DC connection member 9 are increased and their resistance values are decreased, whereby the positive-side connection member 10 and the negative-side connection member 11 can adapt to large current. In addition, by reducing the thicknesses of the positive-side connection member 10 and the negative-side connection member 11, the cost and the weight can be reduced.

In FIG. 4, an example in which the top surface opposed parts 9*b* and the side surface opposed parts 9*c* are provided at a part where the positive-side connection member 10 and the negative-side connection member 11 are arranged without being stacked, is shown. However, the present disclosure is not limited thereto. The top surface opposed parts 9*b* and the side surface opposed parts 9*c* may be provided at a part where the positive-side connection member 10 and the negative-side connection member 11 are arranged in a stacked manner. In a case where the positive-side connection member 10 and the negative-side connection member 11 are arranged in a stacked manner, the top surface opposed part 9*b* of one connection member may have a cutout for the purpose of screwing the other connection member. In a case where the top surface opposed part 9*b* and the side surface opposed part 9*c* are provided at a part where the positive-side connection member 10 and the negative-side connection member 11 are arranged in a stacked manner, even if the top surface opposed part 9*b* of one connection member has a cutout for the purpose of screwing the other connection member, current flowing through the top surface opposed part 9*b* which has a cutout and thus is not a parallel flat plate is reduced but current flows through the side surface opposed part 9*c* which is a parallel flat plate. Thus, reduced inductances of the positive-side connection member 10 and the negative-side connection member 11 can be maintained and a sectional area needed for current conduction can be ensured.

In the present embodiment, as shown in FIG. 5, the additional insulation member 12*a* is provided between the protrusion 3 and the DC connection member 9 thermally connected to the protrusion 3, and the additional insulation member 12*a* is integrated with the insulation member 12 on a side of one side surface of the DC connection member 9 thermally connected to the protrusion 3. In FIG. 5, the DC connection member 9 thermally connected to the protrusion 3 is the negative-side connection member 11. One insulation member is bent at a side surface part of the negative-side connection member 11, thus forming the insulation member 12 and the additional insulation member 12*a*. With this configuration, both insulation parts between the positive-side connection member 10 and the negative-side connection member 11 and between the negative-side connection member 11 and the protrusion 3 can be formed by one insulation member, whereby component cost and working cost for the insulation member can be reduced. In addition, since the insulation member 12 contacting with the positive-side connection member 10 contacts with the housing 2, the effect of heat dissipation from the positive-side connection member 10 to the housing 2 can be enhanced.

In the present embodiment, the power conversion device 1 includes the magnetic member 20 provided at the cooling surface 2*a* and surrounding the DC connection member 9. The magnetic member 20 is a member for suppressing noise. The DC connection member 9 is thermally connected to the cooling surface 2*a* via the magnetic member 20. With this configuration, even at a part where the protrusion 3 is not provided, the DC connection member 9 can be easily thermally connected to the cooling surface 2*a* without changing the length of the DC connection member 9. Although the negative-side connection member 11 is shown in FIG. 5, the positive-side connection member 10 is also surrounded by the magnetic member 20 in the same manner, and thus the positive-side connection member 10 is also thermally connected to the cooling surface 2*a*. In addition, the insulation member 12 may be provided between the DC connection member 9 and the magnetic member 20.

Figure 6:
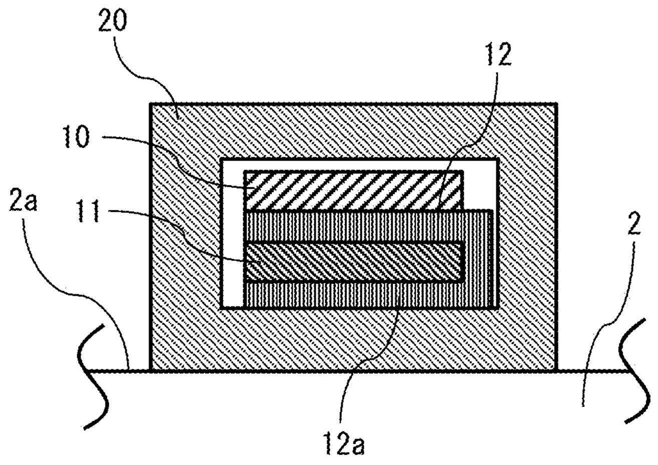
FIG. 6 is a sectional view showing a specific part of another power conversion device according to embodiment 1.

In FIG. 5, an example in which the magnetic member 20 is provided at a part where the positive-side connection member 10 and the negative-side connection member 11 are arranged without being stacked, is shown. However, the present disclosure is not limited thereto. As shown in FIG. 6, the magnetic member 20 may be provided at a part where the positive-side connection member 10 and the negative-side connection member 11 are arranged in a stacked manner. FIG. 6 is a sectional view showing a specific part of another power conversion device 1 according to embodiment 1, taken at the magnetic member 20 part. In FIG. 6, the additional insulation member 12*a* is provided between the magnetic member 20 and the DC connection member 9 thermally connected to the magnetic member 20, and the additional insulation member 12*a* is integrated with the insulation member 12 on a side of one side surface of the DC connection member 9 thermally connected to the magnetic member 20. In FIG. 6, the DC connection member 9 thermally connected to the magnetic member 20 is the negative-side connection member 11. One insulation member is bent at a side surface part of the negative-side connection member 11, thus forming the insulation member 12 and the additional insulation member 12*a*. With this configuration, both insulation parts between the positive-side connection member 10 and the negative-side connection member 11 and between the negative-side connection member 11 and the magnetic member 20 can be formed by one insulation member, whereby component cost and working cost for the insulation member can be reduced. In addition, since the insulation member 12 contacting with the positive-side connection member 10 contacts with the magnetic member 20, the effect of heat dissipation from the positive-side connection member 10 to the magnetic member 20 can be enhanced.

As described above, the power conversion device 1 according to embodiment 1 includes the power module 30 electrically connected to the DC connection member 9, and the capacitor 40 electrically connected to the DC connection member 9. The power module 30 has the module body portion 35, the DC connection terminal protruding from the module body portion 35 and electrically connected to the DC connection member 9, and the AC connection terminal 33 protruding from the module body portion 35 and electrically connected to the AC connection member 13. The AC connection member 13 and the AC connection terminal 33 are located on the one side in the first direction of the module body portion 35, and the capacitor 40 is located on the other side in the first direction of the module body portion 35. The DC connection terminal is located on the one side or the other side in the second direction of the module body portion 35. The DC connection member 9 has the opposed portion opposed to the cooling surface 2*a*, and at least a part of the opposed portion is thermally connected to the cooling surface 2*a*. Thus, heat generated at the DC connection member 9, heat transferred from the power module 30 side to the DC connection member 9, and heat transferred from the capacitor 40 side to the DC connection member 9, can be dissipated to the housing 2 from the opposed portion thermally connected to the cooling surface 2*a*. Thus, the power conversion device 1 having an increased output while suppressing heat generation at the DC connection member 9 can be provided.

The DC connection terminal may have the positive-side DC connection terminal 31 and the negative-side DC connection terminal 32. The DC connection member 9 may have the positive-side connection member 10 electrically connected to the positive-side terminal 41 of the capacitor 40 and the positive-side DC connection terminal 31, and the negative-side connection member 11 electrically connected to the negative-side terminal 42 of the capacitor 40 and the negative-side DC connection terminal 32. The positive-side connection member 10 and the negative-side connection member 11 may be located on the one side or the other side in the second direction of the module body portion 35. Thus, the positive-side connection member 10 and the negative-side connection member 11 do not pass on the control board 70 side of the module body portion 35, and therefore heat of the DC connection member 9 can be efficiently dissipated to the housing 2. In addition, the length of the DC connection member 9 can be shortened, whereby the inductance of the DC connection member 9 can be reduced.

The control board 70 may be located so as to overlap the power module without overlapping the positive-side connection member 10 and the negative-side connection member 11, as seen in the direction perpendicular to the cooling surface 2*a*. Thus, the positive-side connection member 10 and the negative-side connection member 11 are not located on the one side or the other side in the third direction of the control board 70, and therefore heat transfer and noise influence from the positive-side connection member 10 and the negative-side connection member 11 to the control board 70 can be reduced. The positive-side connection member 10 and the negative-side connection member 11 may be each formed in a plate shape, and the positive-side connection member 10 and the negative-side connection member 11 may have parts arranged in a stacked manner with the insulation member 12 interposed therebetween. Thus, the positive-side connection member 10 and the negative-side connection member 11 are arranged so as to form parallel flat plates, whereby the inductance of the DC connection member 9 can be reduced.

The cooling surface 2*a* may have the protrusion 3 protruding toward the DC connection member 9 side, and at least a part of the opposed portion may be thermally connected to the protrusion 3. Thus, heat generated at the DC connection member 9, heat transferred from the positive-side DC connection terminal 31 and the negative-side DC connection terminal 32 to the DC connection member 9, and heat transferred from the positive-side terminal 41 and the negative-side terminal 42 to the DC connection member 9, can be easily dissipated to the housing 2 through the protrusion 3. In addition, in a case where the protrusion 3 is provided and the opposed portion is thermally connected to the protrusion 3, the length of the DC connection member 9 can be shortened, whereby the inductance of the DC connection member 9 can be reduced.

At least a part of the opposed portion may have the top surface opposed part 9*b* opposed to the top surface of the protrusion 3, and the side surface opposed part 9*c* opposed to the side surface of the protrusion 3, and thus may be bent so as to surround the protrusion 3. Thus, the area of the opposed portion of the DC connection member 9 thermally connected to the protrusion 3 can be increased, whereby the effect of heat dissipation from the DC connection member 9 to the housing 2 can be enhanced. The additional insulation member 12*a* may be provided between the protrusion 3 and the DC connection member 9 thermally connected to the protrusion 3, and the additional insulation member 12*a* may be integrated with the insulation member 12 on a side of one side surface of the DC connection member 9 thermally connected to the protrusion 3. Thus, both insulation parts between the positive-side connection member 10 and the negative-side connection member 11 and between the negative-side connection member 11 and the protrusion 3 can be formed by one insulation member, whereby component cost and working cost for the insulation member can be reduced.

The power conversion device may include the magnetic member 20 provided at the cooling surface 2*a* and surrounding the DC connection member 9, and the DC connection member 9 may be thermally connected to the cooling surface 2*a* via the magnetic member 20. Thus, even at a part where the protrusion 3 is not provided, the DC connection member 9 can be easily thermally connected to the cooling surface 2*a* without changing the length of the DC connection member 9. The additional insulation member 12*a* may be provided between the magnetic member 20 and the DC connection member 9 thermally connected to the magnetic member 20, and the additional insulation member 12*a* may be integrated with the insulation member 12 on a side of one side surface of the DC connection member 9 thermally connected to the magnetic member 20. Thus, both insulation parts between the positive-side connection member 10 and the negative-side connection member 11 and between the negative-side connection member 11 and the magnetic member 20 can be formed by one insulation member, whereby component cost and working cost for the insulation member can be reduced.

The capacitor 40 may be thermally connected to the cooling surface 2*a*. Thus, heat generated at the capacitor 40 is transferred to the housing 2, whereby temperature increase in the capacitor 40 can be suppressed. The DC connection member 9 may be branched at a part between the capacitor 40 and the DC connection terminal, and the branched connection member which is a branched part of the DC connection member may have, at an end on a side opposite to a branch-base side, the power supply connection terminal portion 9*a* connected to the DC power supply. Thus, even in a case where the power supply connection terminal portion 9*a* is connected to the battery 100 which is the DC power supply, at the DC input portion 60, and large current is sent or received to or from the DC side, e.g., power is supplied from the DC input portion 60 to another power module or load, since at least a part of the opposed portion of the DC connection member 9 is thermally connected to the cooling surface 2*a*, temperature increase in the capacitor 40 can be suppressed and a long life of the capacitor 40 can be ensured.

The power semiconductor element 300 that the power module 30 has may be a wide bandgap semiconductor element. Thus, since the wide bandgap semiconductor element is small in ON resistance, small in loss, and small in heat generation, the chip area can be reduced, whereby the size of the power module 30 can be reduced. The power semiconductor element 300 that the power module 30 has may be an RC-IGBT having a switching element and a flyback diode integrated with each other. Thus, it becomes unnecessary to provide a flyback diode, so that the number of elements provided in the power module 30 is decreased, whereby the size of the power module 30 can be reduced.

Embodiment 2

Figure 7:
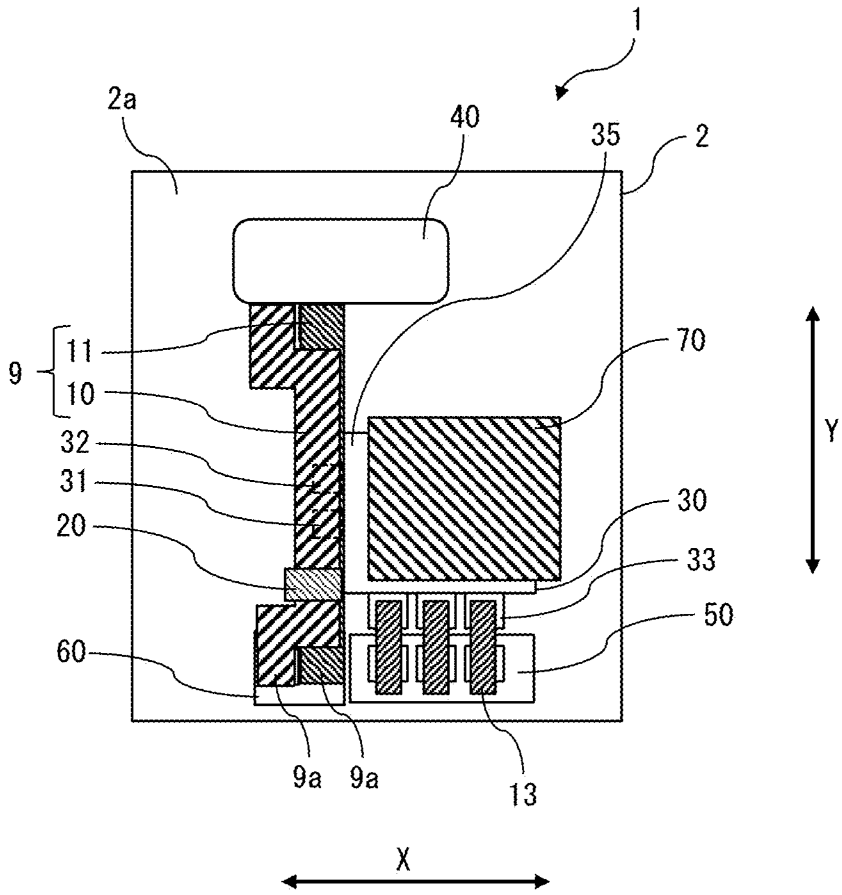
FIG. 7 is a plan view schematically showing a power conversion device according to embodiment 2.

A power conversion device 1 according to embodiment 2 will be described. FIG. 7 is a plan view schematically showing the power conversion device 1 according to embodiment 2. In the power conversion device 1 according to embodiment 2, the shape of the DC connection member 9 and the location of the DC input portion 60 are different from those in embodiment 1.

The DC connection member 9 extends from the positive-side DC connection terminal 31 and the negative-side DC connection terminal 32 which are DC connection terminals, toward the one side in the first direction of the module body portion 35 and the other side in the first direction of the module body portion 35. The DC connection member 9 is connected to the capacitor 40, at a part extending toward the other side in the first direction of the module body portion 35. The DC connection member 9 has, at an end on the one side in the first direction, the power supply connection terminal portion 9*a* connected to the DC power supply. The power supply connection terminal portion 9*a* is connected to the battery 100 which is the DC power supply, at the DC input portion 60. The DC input portion 60 is located on the one side in the first direction of the module body portion 35, as with the AC output portion 50, so as to be adjacent to the AC output portion 50. The negative-side connection member 11 is formed to be, for example, partially bent, so as not to contact with the positive-side DC connection terminal 31.

Since the power supply connection terminal portion 9*a* is located on the one side in the first direction of the DC connection member 9 and the DC input portion 60 is located on the one side in the first direction of the module body portion 35, the DC input portion 60 and the AC output portion 50 are located on the one side in the first direction of the module body portion 35. Thus, when the power conversion device 1 is provided in a vehicle, connections between the power conversion device 1, and the battery 100 and the three-phase motor 101, can be performed from the same direction, whereby assemblability of the power conversion device 1 can be improved. In addition, shock-proofness which is particularly important for a high-voltage product provided in a vehicle can be ensured by only a measure for one location on the one side in the first direction of the module body portion 35. In addition, since the length in the first direction of the DC connection member 9 increases, the opposed portion is enlarged, so that heat is further transferred from the DC connection member 9 to the housing 2, whereby heat transfer from the DC connection member 9 to the capacitor 40 can be reduced. Since heat transfer from the DC connection member 9 to the capacitor 40 is reduced and thus temperature increase in the capacitor 40 is suppressed, the life of the capacitor 40 can be prolonged.

Embodiment 3

Figure 8:
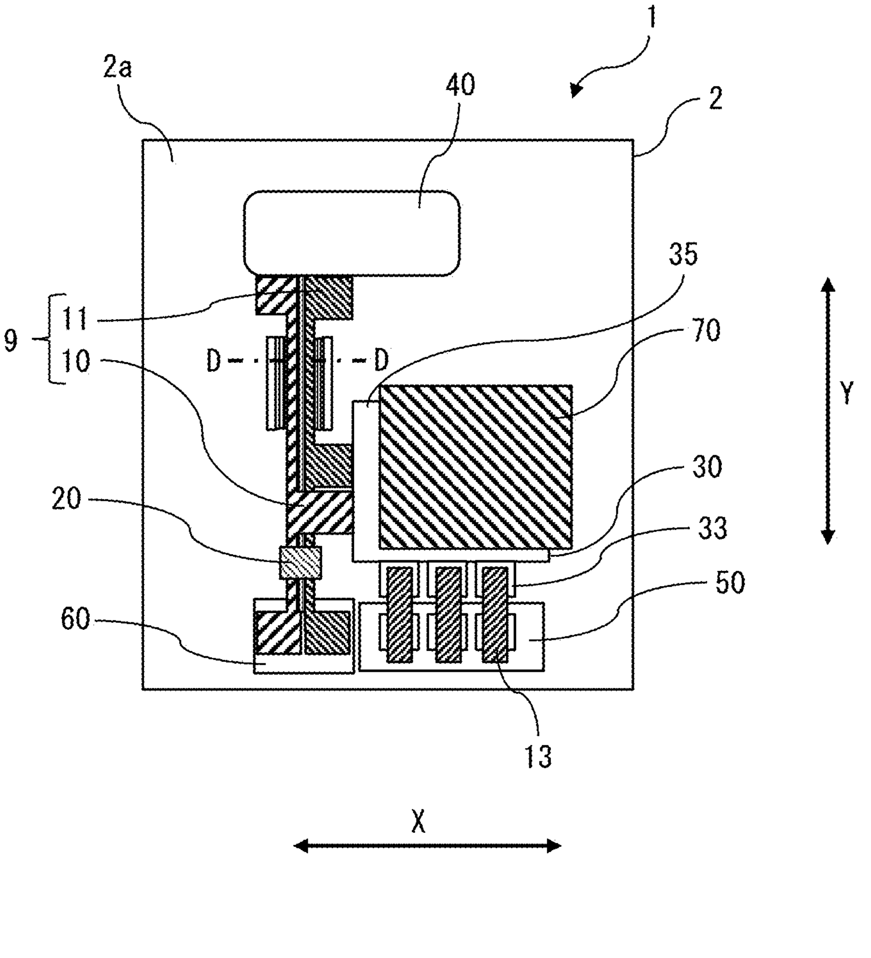
FIG. 8 is a plan view schematically showing a power conversion device according to embodiment 3.
Figure 9:
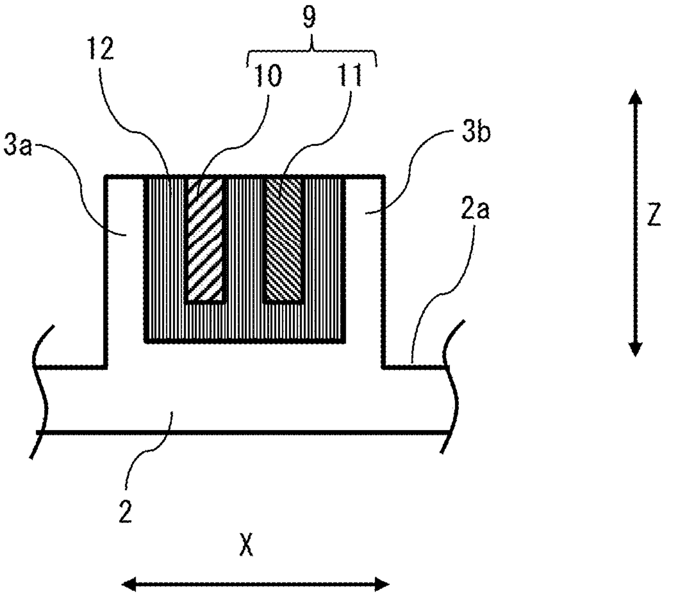
FIG. 9 is a sectional view of the power conversion device taken at a D-D cross-section position in FIG. 8.

A power conversion device 1 according to embodiment 3 will be described. FIG. 8 is a plan view schematically showing the power conversion device 1 according to embodiment 3, and FIG. 9 is a sectional view of the power conversion device 1 taken at a D-D cross-section position in FIG. 8. In the power conversion device 1 according to embodiment 3, the shape of the protrusion 3 is different from that in embodiment 1.

The cooling surface 2*a* has a first protrusion 3*a* and a second protrusion 3*b* provided with an interval therebetween and protruding toward the DC connection member 9 side. At least a part of the opposed portion of the DC connection member 9 is located so as to be interposed between a side surface of the first protrusion 3*a* and a side surface of the second protrusion 3*b*, and is thermally connected to the side surface of the first protrusion 3*a* and the side surface of the second protrusion 3*b*. In the present embodiment, the DC connection member 9 is thermally connected to the side surface of the first protrusion 3*a* and the side surface of the second protrusion 3*b* via the insulation member 12. In the present embodiment, the DC connection member 9 is stacked in the second direction. However, without limitation thereto, the DC connection member 9 may be stacked in the third direction as in embodiment 1.

With this configuration, since the DC connection member 9 is interposed between the side surface of the first protrusion 3*a* and the side surface of the second protrusion 3*b*, heat dissipation performance from the DC connection member 9 to the housing 2 can be enhanced. Since heat transfer from the DC connection member 9 to the housing 2 is promoted, heat transfer from the DC connection member 9 to the capacitor 40 can be reduced. Since heat transfer from the DC connection member 9 to the capacitor 40 is reduced and thus temperature increase in the capacitor 40 is suppressed, the life of the capacitor 40 can be prolonged.

Embodiment 4

Figure 10:
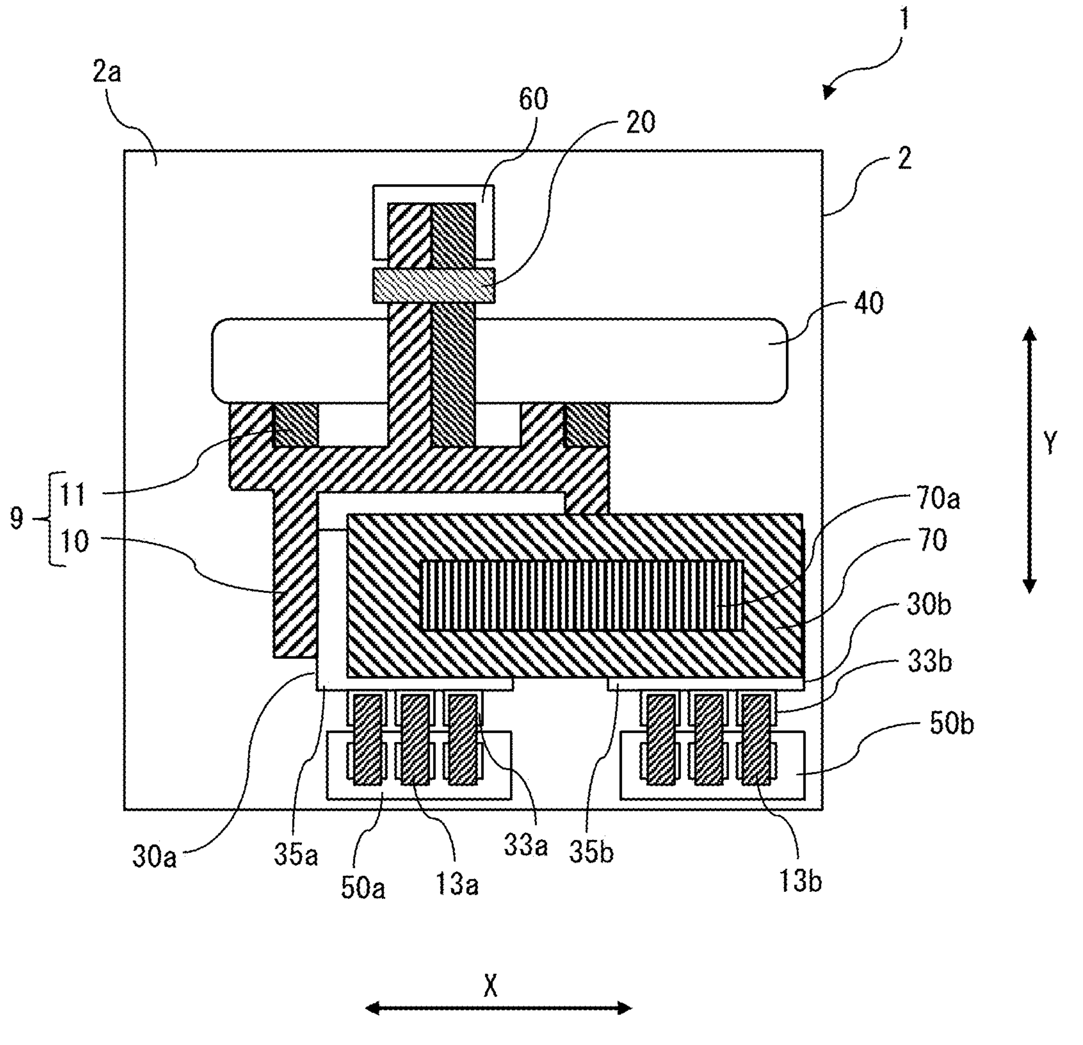
FIG. 10 is a plan view schematically showing a power conversion device according to embodiment 4.
Figure 11:
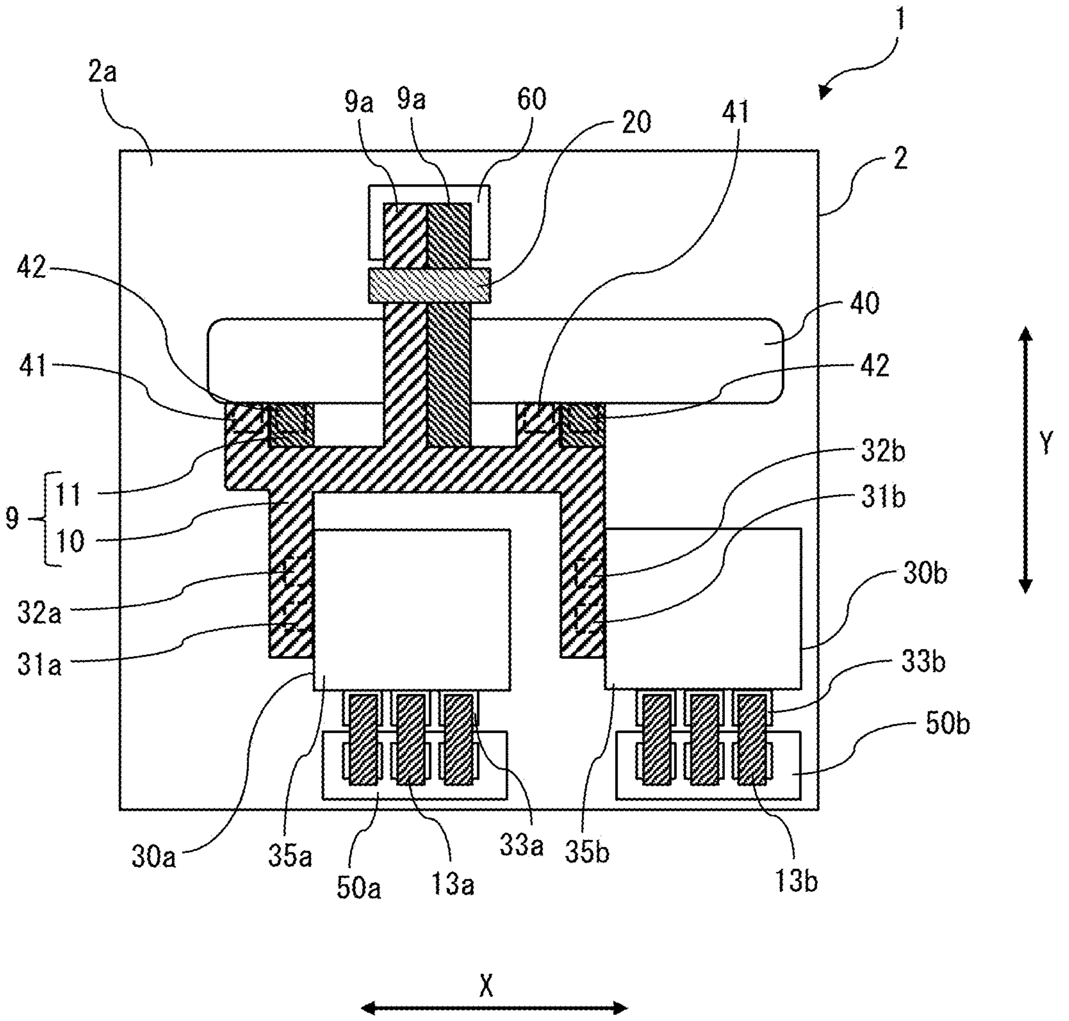
FIG. 11 is another plan view schematically showing the power conversion device according to embodiment 4.

A power conversion device 1 according to embodiment 4 will be described. FIG. 10 is a plan view schematically showing the power conversion device 1 according to embodiment 4, and FIG. 11 is another plan view schematically showing the power conversion device 1, with the control board 70 removed. The power conversion device 1 according to embodiment 4 includes two power modules.

The power conversion device 1 includes a plurality of power modules, and the plurality of power modules are provided so as to be arranged in the second direction. In the present embodiment, the power conversion device 1 includes a first power module 30*a* and a second power module 30*b*, and the first power module 30*a* and the second power module 30*b* are provided so as to be arranged in the second direction.

As shown in FIG. 11, the first power module 30*a* has a first module body portion 35*a*, a first positive-side DC connection terminal 31*a* and a first negative-side DC connection terminal 32*a* which are DC connection terminals protruding from the first module body portion 35*a* and electrically connected to the DC connection member 9, and a first AC connection terminal 33*a* protruding from the first module body portion 35*a* and electrically connected to a first AC connection member 13*a*. The second power module 30*b* has a second module body portion 35*b*, a second positive-side DC connection terminal 31*b* and a second negative-side DC connection terminal 32*b* which are DC connection terminals protruding from the second module body portion 35*b* and electrically connected to the DC connection member 9, and a second AC connection terminal 33*b* protruding from the second module body portion 35*b* and electrically connected to the second AC connection member 13*b*. Arrangement of these terminals is the same as that of the terminals of the power module 30 shown in embodiment 1.

The DC connection member 9 has the positive-side connection member 10 electrically connected to the positive-side terminal 41 of the capacitor 40, the first positive-side DC connection terminal 31*a*, and the second positive-side DC connection terminal 31*b*, and the negative-side connection member 11 electrically connected to the negative-side terminal 42 of the capacitor 40, the first negative-side DC connection terminal 32*a*, and the second negative-side DC connection terminal 32*b*. A first AC output portion 50*a* is located on the one side in the first direction of the first module body portion 35*a*. A second AC output portion 50*b* is located on the one side in the first direction of the second module body portion 35*b*. The DC input portion 60 is located on the other side in the first direction of the capacitor 40. The DC connection member 9 is connected to the battery 100 (not shown), at the DC input portion 60.

With this configuration, the DC connection terminal and the AC connection terminal are separately provided in different directions, and therefore, even in a case where two or more power modules are provided, the power modules can be arranged in a row, whereby the size of the power conversion device 1 can be reduced. In addition, the capacitor 40 and each power module can be connected in the same manner as in embodiment 1, and therefore, even in a case where a plurality of power modules are provided, a complicated assembly process such as arranging the capacitor 40 or the power modules three-dimensionally is not needed, so that the same production process as in embodiment 1 can be used. Since the same production process as in embodiment 1 can be used, mixed-flow production with the power conversion device 1 of embodiment 1 can be performed. In addition, connection from the first AC connection terminal 33*a* to the first AC output portion 50*a* and connection from the second AC connection terminal 33*b* to the second AC output portion 50*b* can be made through the shortest distances, whereby component cost is reduced, the weights of components can be reduced, and radiation noise can be reduced.

In the present embodiment, lengths of the DC connection member 9 between each DC connection terminal of the plurality of power modules and the power supply connection terminal portion 9*a* which is a part of the DC connection member 9 and is connected to the DC power supply, are equivalent to each other. In FIG. 11, the length of the DC connection member 9 between the first positive-side DC connection terminal 31*a* and the power supply connection terminal portion 9*a* is equivalent to the length of the DC connection member 9 between the second positive-side DC connection terminal 31*b* and the power supply connection terminal portion 9*a*. Being equivalent means that the difference between compared lengths is within 10%. In the present embodiment, the DC input portion 60 is located on the other side in the first direction between the first positive-side DC connection terminal 31*a* and the second positive-side DC connection terminal 31*b*. With this configuration, power can be supplied to the first power module 30*a* and the second power module 30*b* with no delay therebetween, whereby the two power modules can be used in parallel. Since the two power modules can be used in parallel, it is possible to adapt to output increase for the two power modules, and thus it is possible to adapt also to a six-phase motor.

In the present embodiment, as shown in FIG. 10, the control board 70 has one control operation unit 70*a* for controlling switching operations of power semiconductor elements that the plurality of power modules respectively have. In FIG. 10, the control operation unit 70*a* controls the first power module 30*a* and the second power module 30*b*. With this configuration, the plurality of power modules are controlled by one control operation unit 70*a*, and thus synchronous control or phase difference control for the plurality of power modules can be easily performed.

Regarding a case where the power conversion device 1 according to the present embodiment is provided in a vehicle, an application example for a series hybrid in which power is generated by an engine and the power is used for traveling of the vehicle or charging of a battery, will be described.

In a case where the remaining battery amount is sufficiently large, power of the battery 100 is supplied through the DC input portion 60 to the first power module 30*a* or the second power module 30*b* for traveling, so that the vehicle travels. At this time, DC current is maximized between the DC input portion 60 and the part from which the DC connection member 9 is branched to the DC input portion 60. In the arrangement shown in FIG. 10, the part where DC current is maximized is away from the positive-side terminal 41 and the negative-side terminal 42 of the capacitor 40, and therefore thermal influence on the capacitor 40 is extremely small.

In a case where the remaining battery amount is small, power is supplied from the power module for power generation (the other one different from the power module for traveling) through the DC connection member 9 to the power module for traveling, so that the vehicle travels. In addition, power is supplied through the DC connection member 9, to charge the battery 100. At this time, DC current is maximized between the power module for power generation and the part from which the DC connection member 9 is branched to the DC input portion 60. In the arrangement shown in FIG. 11, the protrusion 3 may be provided near a connection part of the DC connection member 9 with the capacitor 40 or at the positive-side terminal 41 and the negative-side terminal 42 of the capacitor 40, whereby thermal influence on the capacitor 40 can be reduced.

In FIG. 11, the DC connection member 9 is located between the capacitor 40, and the first power module 30*a* and the second power module 30*b*. However, the location of the DC connection member 9 is not limited thereto. For example, the DC input portion 60 may be located adjacently to the first AC output portion 50*a*, whereby the DC connection member 9 can be located on the side of the first AC output portion 50*a* and the second AC output portion 50*b*. In a case where the DC connection member 9 is located on the side of the first AC output portion 50*a* and the second AC output portion 50*b*, thermal influence on the capacitor 40 can be further reduced.

A gap may be provided between the capacitor 40 and the cooling surface 2*a*, and the DC connection member 9 may be located in the gap. In a case where the DC connection member 9 is located in a gap between the capacitor 40 and the cooling surface 2*a*, the DC connection member 9 can be efficiently cooled. In addition, the capacitor 40 can be located near the first power module 30*a* and the second power module 30*b*, so that heat generation at the power semiconductor elements 300 is reduced owing to inductance reduction of the DC connection member 9, whereby efficiency of the power conversion device 1 can be enhanced.

In FIG. 10, an example in which two power modules are provided is shown, but the number of power modules is not limited to two. For example, with three power modules provided to the power conversion device 1, front wheels and rear wheels can be controlled separately from each other. In this way, also in a case where an additional function is imparted to the power conversion device 1, the power conversion device 1 according to the present disclosure is effective.

An example in which the power conversion device 1 according to the present embodiment is applied to an electric vehicle having a large-output motor, will be described. In general, there is an upper limit on current that can flow through a power module, and a plurality of power modules are needed for driving a large-output motor. Examples of large-output motors include a motor with six phases instead of three phases, and a motor having two sets of windings while having three phases.

In the power conversion device 1 shown in FIG. 11, the length of the DC connection member 9 between the first positive-side DC connection terminal 31*a* and the power supply connection terminal portion 9*a* is equivalent to the length of the DC connection member 9 between the second positive-side DC connection terminal 31*b* and the power supply connection terminal portion 9*a*. Thus, power can be supplied to the first power module 30*a* and the second power module 30*b* with no delay therebetween, whereby the two power modules can be used in parallel. Since the two power modules can be used in parallel, it is possible to adapt to output increase for the two power modules, and thus it is possible to adapt also to a six-phase motor and a three-phase two-set inverter.

By using the configuration of the power conversion device 1 according to the present disclosure, the power conversion device 1 adapted to one small-output motor, two small-output motors, or one large-output motor, can be manufactured with a similar component configuration and similar component arrangement. In addition, mixed-flow production can be performed on the same assembly line, whereby production efficiency of the power conversion device 1 can be improved.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

Hereinafter, modes of the present disclosure are summarized as additional notes.

(Additional Note 1)

A power conversion device comprising:

a DC connection member through which DC power flows;

an AC connection member through which AC power flows;

a power module electrically connected to the DC connection member and the AC connection member, and having a power semiconductor element for performing power conversion between the DC power of the DC connection member and the AC power of the AC connection member;

a capacitor electrically connected to the DC connection member;

a housing having a cooler and a cooling surface cooled by the cooler, the power module being thermally connected to the cooling surface; and a control board which controls a switching operation of the power semiconductor element, wherein the power module has a module body portion, a DC connection terminal protruding from the module body portion and electrically connected to the DC connection member, and an AC connection terminal protruding from the module body portion and electrically connected to the AC connection member, one direction parallel to the cooling surface is defined as a first direction, and a direction parallel to the cooling surface and perpendicular to the first direction is defined as a second direction, the AC connection member and the AC connection terminal are located on one side in the first direction of the module body portion, and the capacitor is located on another side in the first direction of the module body portion, the DC connection terminal is located on one side or another side in the second direction of the module body portion, and the DC connection member has an opposed portion opposed to the cooling surface, and at least a part of the opposed portion is thermally connected to the cooling surface.

(Additional Note 2)

The power conversion device according to additional note 1, wherein the DC connection terminal has a positive-side DC connection terminal and a negative-side DC connection terminal, the DC connection member has a positive-side connection member electrically connected to a positive-side terminal of the capacitor and the positive-side DC connection terminal, and a negative-side connection member electrically connected to a negative-side terminal of the capacitor and the negative-side DC connection terminal, and the positive-side connection member and the negative-side connection member are located on the one side or the other side in the second direction of the module body portion.

(Additional Note 3)

The power conversion device according to additional note 2, wherein the control board is located so as to overlap the power module without overlapping the positive-side connection member and the negative-side connection member, as seen in a direction perpendicular to the cooling surface.

(Additional Note 4)

The power conversion device according to additional note 2 or 3, wherein the positive-side connection member and the negative-side connection member are each formed in a plate shape, and the positive-side connection member and the negative-side connection member have parts arranged in a stacked manner with an insulation member interposed therebetween.

(Additional Note 5)

The power conversion device according to any one of additional notes 1 to 4, wherein the cooling surface has a protrusion protruding toward the DC connection member side, and at least a part of the opposed portion is thermally connected to the protrusion.

(Additional Note 6)

The power conversion device according to additional note 5, wherein at least a part of the opposed portion has a top surface opposed part opposed to a top surface of the protrusion and a side surface opposed part opposed to a side surface of the protrusion, and thus is bent so as to surround the protrusion.

(Additional Note 7)

The power conversion device according to any one of additional notes 1 to 4, wherein the cooling surface has a first protrusion and a second protrusion provided with an interval therebetween and protruding toward the DC connection member side, and at least a part of the opposed portion is located so as to be interposed between a side surface of the first protrusion and a side surface of the second protrusion, and is thermally connected to the side surface of the first protrusion and the side surface of the second protrusion.

(Additional Note 8)

The power conversion device according to additional note 5, wherein an additional insulation member is provided between the protrusion and the DC connection member thermally connected to the protrusion, and the additional insulation member is integrated with the insulation member on a side of one side surface of the DC connection member thermally connected to the protrusion.

(Additional Note 9)

The power conversion device according to any one of additional notes 1 to 4, comprising a magnetic member provided at the cooling surface and surrounding the DC connection member, wherein the DC connection member is thermally connected to the cooling surface via the magnetic member.

(Additional Note 10)

The power conversion device according to additional note 9, wherein an additional insulation member is provided between the magnetic member and the DC connection member thermally connected to the magnetic member, and the additional insulation member is integrated with the insulation member on a side of one side surface of the DC connection member thermally connected to the magnetic member.

(Additional Note 11)

The power conversion device according to any one of additional notes 1 to 10, wherein the capacitor is thermally connected to the cooling surface.

(Additional Note 12)

The power conversion device according to any one of additional notes 1 to 11, wherein the DC connection member is branched at a part between the capacitor and the DC connection terminal, and a branched connection member which is a branched part of the DC connection member has, at an end on a side opposite to a branch-base side, a power supply connection terminal portion connected to a DC power supply.

(Additional Note 13)

The power conversion device according to any one of additional notes 1 to 11, wherein the DC connection member extends from the DC connection terminal toward the one side in the first direction of the module body portion and the other side in the first direction of the module body portion, and the DC connection member has, at an end on the one side in the first direction, a power supply connection terminal portion connected to a DC power supply.

(Additional Note 14)

The power conversion device according to any one of additional notes 1 to 13, comprising a plurality of the power modules, wherein the plurality of power modules are provided so as to be arranged in the second direction.

(Additional Note 15)

The power conversion device according to additional note 14, wherein lengths of the DC connection member between each DC connection terminal of the plurality of power modules and a power supply connection terminal portion which is a part of the DC connection member and is connected to a DC power supply, are equivalent to each other.

(Additional Note 16)

The power conversion device according to additional note 14 or 15, wherein the control board has one control operation unit for controlling switching operations of the power semiconductor elements that the plurality of power modules respectively have.

(Additional Note 17)

The power conversion device according to any one of additional notes 1 to 16, wherein the power semiconductor element that the power module has is a wide bandgap semiconductor element.

(Additional Note 18)

The power conversion device according to any one of additional notes 1 to 16, wherein the power semiconductor element that the power module has is an RC-IGBT having a switching element and a flyback diode integrated with each other.

DESCRIPTION OF THE REFERENCE CHARACTERS

1 power conversion device
2 housing
2*a* cooling surface
3 protrusion
3*a* first protrusion
3*b* second protrusion
4 cooler
9 DC connection member
9*a* power supply connection terminal portion
9*b* top surface opposed part
9*c* side surface opposed part
10 positive-side connection member
11 negative-side connection member
12 insulation member
12*a* additional insulation member
13 AC connection member
13*a* first AC connection member
13*b* second AC connection member
20 magnetic member
30 power module
30*a* first power module
30*b* second power module
300 power semiconductor element
31 positive-side DC connection terminal
31*a* first positive-side DC connection terminal
31*b* second positive-side DC connection terminal
32 negative-side DC connection terminal
32*a* first negative-side DC connection terminal
32*b* second negative-side DC connection terminal
33 AC connection terminal
33*a* first AC connection terminal
33*b* second AC connection terminal
34 signal terminal
35 module body portion
35*a* first module body portion
35*b* second module body portion
40 capacitor
41 positive-side terminal
42 negative-side terminal
50 AC output portion
50*a* first AC output portion
50*b* second AC output portion
60 DC input portion
70 control board
70*a* control operation unit
100 battery
101 three-phase motor

The invention claimed is:

1. A power conversion device comprising:

a DC connection member through which DC power flows;

an AC connection member through which AC power flows;

a power module electrically connected to the DC connection member and the AC connection member, and having a power semiconductor element for performing power conversion between the DC power of the DC connection member and the AC power of the AC connection member;

a capacitor electrically connected to the DC connection member;

a housing having a cooler and a cooling surface cooled by the cooler, the power module being thermally connected to the cooling surface; and a control board which controls a switching operation of the power semiconductor element, wherein the power module has a module body portion, a DC connection terminal protruding from the module body portion and electrically connected to the DC connection member, and an AC connection terminal protruding from the module body portion and electrically connected to the AC connection member, one direction parallel to the cooling surface is defined as a first direction, and a direction parallel to the cooling surface and perpendicular to the first direction is defined as a second direction, the AC connection member and the AC connection terminal are located on one side in the first direction of the module body portion, and the capacitor is located on another side in the first direction of the module body portion, the DC connection terminal is located on one side or another side in the second direction of the module body portion, and the DC connection member has an opposed portion opposed to the cooling surface, and at least a part of the opposed portion is thermally connected to the cooling surface.

2. The power conversion device according to claim 1, wherein the DC connection terminal has a positive-side DC connection terminal and a negative-side DC connection terminal, the DC connection member has a positive-side connection member electrically connected to a positive-side terminal of the capacitor and the positive-side DC connection terminal, and a negative-side connection member electrically connected to a negative-side terminal of the capacitor and the negative-side DC connection terminal, and the positive-side connection member and the negative-side connection member are located on the one side or the other side in the second direction of the module body portion.

3. The power conversion device according to claim 2, wherein the control board is located so as to overlap the power module without overlapping the positive-side connection member and the negative-side connection member, as seen in a direction perpendicular to the cooling surface.

4. The power conversion device according to claim 2, wherein the positive-side connection member and the negative-side connection member are each formed in a plate shape, and the positive-side connection member and the negative-side connection member have parts arranged in a stacked manner with an insulation member interposed therebetween.

5. The power conversion device according to claim 1, wherein the cooling surface has a protrusion protruding toward the DC connection member side, and at least a part of the opposed portion is thermally connected to the protrusion.

6. The power conversion device according to claim 5, wherein at least a part of the opposed portion has a top surface opposed part opposed to a top surface of the protrusion and a side surface opposed part opposed to a side surface of the protrusion, and thus is bent so as to surround the protrusion.

7. The power conversion device according to claim 5, wherein an additional insulation member is provided between the protrusion and the DC connection member thermally connected to the protrusion, and the additional insulation member is integrated with the insulation member on a side of one side surface of the DC connection member thermally connected to the protrusion.

8. The power conversion device according to claim 1, wherein the cooling surface has a first protrusion and a second protrusion provided with an interval therebetween and protruding toward the DC connection member side, and at least a part of the opposed portion is located so as to be interposed between a side surface of the first protrusion and a side surface of the second protrusion, and is thermally connected to the side surface of the first protrusion and the side surface of the second protrusion.

9. The power conversion device according to claim 1, comprising a magnetic member provided at the cooling surface and surrounding the DC connection member, wherein the DC connection member is thermally connected to the cooling surface via the magnetic member.

10. The power conversion device according to claim 9, wherein an additional insulation member is provided between the magnetic member and the DC connection member thermally connected to the magnetic member, and the additional insulation member is integrated with the insulation member on a side of one side surface of the DC connection member thermally connected to the magnetic member.

11. The power conversion device according to claim 1, wherein the capacitor is thermally connected to the cooling surface.

12. The power conversion device according to claim 1, wherein the DC connection member is branched at a part between the capacitor and the DC connection terminal, and a branched connection member which is a branched part of the DC connection member has, at an end on a side opposite to a branch-base side, a power supply connection terminal portion connected to a DC power supply.

13. The power conversion device according to claim 1, wherein the DC connection member extends from the DC connection terminal toward the one side in the first direction of the module body portion and the other side in the first direction of the module body portion, and the DC connection member has, at an end on the one side in the first direction, a power supply connection terminal portion connected to a DC power supply.

14. The power conversion device according to claim 1, further comprising a plurality of power modules, wherein the plurality of power modules are provided so as to be arranged in the second direction.

15. The power conversion device according to claim 14, wherein lengths of the DC connection member between each DC connection terminal of the plurality of power modules and a power supply connection terminal portion which is a part of the DC connection member and is connected to a DC power supply, are equivalent to each other.

16. The power conversion device according to claim 14, wherein the control board has one control operation processor for controlling switching operations of the power semiconductor elements that the plurality of power modules respectively have.

17. The power conversion device according to claim 1, wherein the power semiconductor element that the power module has is-a wide bandgap semiconductor element.

18. The power conversion device according to claim 1, wherein the power semiconductor element that the power module has an RC-IGBT having a switching element and a flyback diode integrated with each other.

* * * * *